Aug. 20, 1946.　　　G. E. DATH　　　2,406,064
SHOCK ABSORBER
Filed Dec. 4, 1943
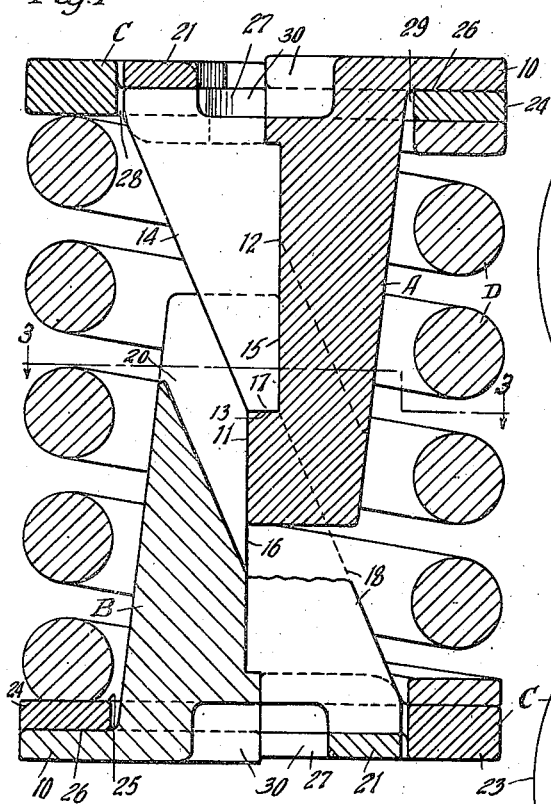
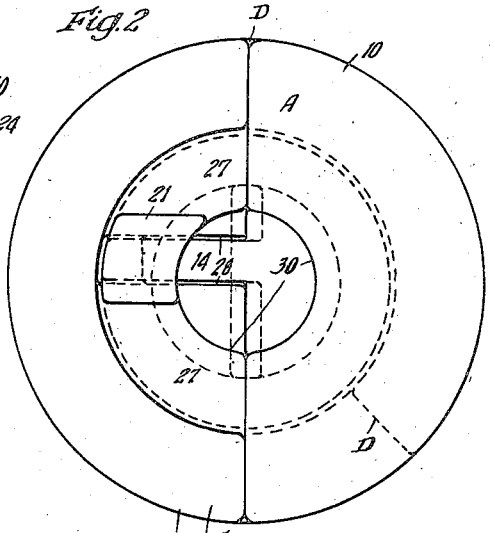
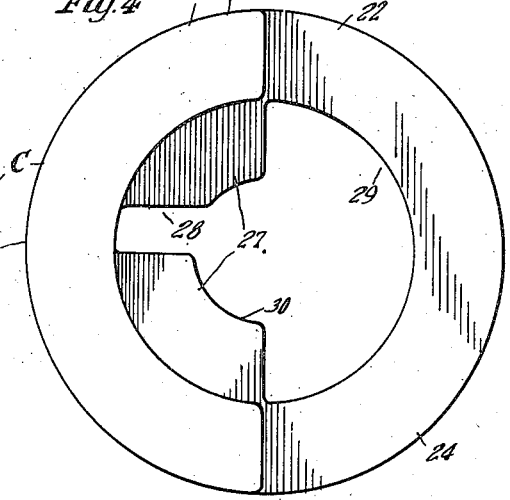
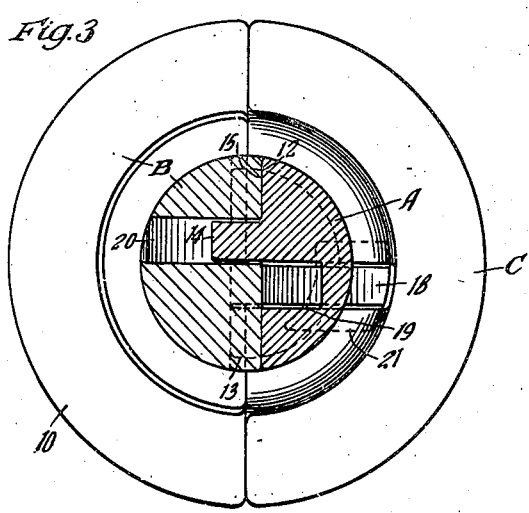
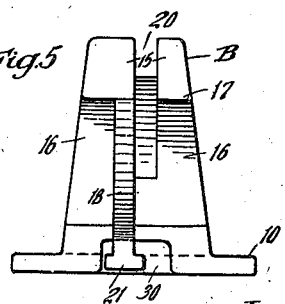
Inventor
George E. Dath
By Henry Fuchs
Atty.

Patented Aug. 20, 1946

2,406,064

UNITED STATES PATENT OFFICE 2,406,064

SHOCK ABSORBER

George E. Dath, Chicago, Ill., assignor to W. H. Miner, Inc., Chicago, Ill., a corporation of Delaware Application December 4, 1943, Serial No. 512,862

7 Claims. (Cl. 267—9)

This invention relates to improvements in shock absorbers, especially adapted for use in connection with truck springs of railway cars for snubbing or dampening the action of the springs.

One object of the invention is to provide a friction shock absorber adapted for use in connection with truck springs of railway cars comprising a pair of relatively movable and rockable friction posts; and a coil spring surrounding said posts and opposing relative movement of said posts in lengthwise direction, wherein the posts are rocked toward each other by the pressure exerted by the surrounding coil spring.

A more specific object of the invention is to provide a shock absorber, as set forth in the preceding paragraph, wherein the pressure of the coil spring which surrounds the posts is transmitted to the latter to produce rocking movement of the same through end followers to which the posts are anchored.

Other objects of the invention will more clearly appear from the description and claims hereinafter following.

In the drawing forming a part of this specification, Figure 1 is a transverse vertical sectional view of my improved shock absorber, said view being on a central plane. Figure 2 is a top plan view of Figure 1. Figure 3 is a transverse horizontal sectional view, corresponding substantially to the line 3—3 of Figure 1, the spring being omitted. Figure 4 is a top plan view of the upper follower ring of the mechanism. Figure 5 is an elevational view, on a reduced scale of the post, at the left hand side of Figure 1, looking from right to left in said Figure 1.

As shown in the drawing, my improved shock absorber comprises broadly two identical friction posts A and B; a pair of spring followers C—C; and a spring resistance D.

The friction posts A and B are of identical design, as hereinafter pointed out. On the outer side, each post has a laterally, outwardly projecting, semi-circular flange 10 at the base thereof, the flange of the post A being at the upper end thereof and that of the post B being at the lower end. Each post is of broadly semicircular transverse cross section, the base portion thereof, that is, the end portion at the flange 10 being in the form of a half cylinder. Each post is preferably tapered toward its outer end, as clearly shown in Figure 1. At the inner side, the post A presents a longitudinally extending flat friction surface 11 at its lower or outer end and an upper or inner flat friction surface 12, which is laterally offset with respect to the surface 11. The lower end of the post A is thus provided with a transversely extending, laterally projecting, stop shoulder 13 at the lower end thereof between the offset surfaces 11 and 12. A longitudinally extending narrow web 14 projects transversely from the post A at the friction surface side thereof, forming a guide rib which cooperates with a groove or slot in the post B, as hereinafter pointed out. The web 14, which forms, in effect, a leg portion, tapers toward the lower end of the post and terminates at the shoulder 13, as clearly shown in Figure 1. The web 14 is located at one side of the central vertical axis of the mechanism, that is, to one side of a vertical plane at right angles to the friction surfaces 11 and 12 of the post and coincident with the vertical central axis of the mechanism. The friction post B has a longitudinally extending flat friction surface 15 on the inner side thereof, slidably engaging the friction surface 12 of the post A. The friction surface 15 is located at the upper end portion of the post B, and below or inwardly of the friction surface the post is provided with a second friction surface 16, which is offset inwardly with respect to the surface 15, thereby providing a transversely extending stop shoulder 17 at the inner end of the friction surface 15, overhanging the stop shoulder 13 of the post A and adapted to engage the last named shoulder to limit longitudinal separation of the posts A and B. The friction surface 16 of the post B is in sliding engagement with the friction surface 11 of the post A. On the inner side, that is, the friction surface side of the post B, a web 18 is provided, which is identical with the web 14 of the post A and forms a leg for the post. The web 18 is located beside the web 14 at the other side of the central longitudinal axis of the mechanism. Each post is provided with a longitudinal guide groove or slot, accommodating the web of the other post, the guide groove of the post A, which receives the web 18 of the post B, being indicated by 19, and that of the post B, which receives the web 14 of the post A, being indicated by 20. The webs or legs 14 and 18 of the posts A and B are provided with T-heads, adapted to interlock with the followers C—C, as hereinafter pointed out, the T-head 21 of the web 14 of the post A being located at the upper end of the latter and the T-head of the web of the post B being located at the lower end of the latter.

The spring followers C—C, which are of similar design, are located respectively at the top and bottom of the mechanism at the bases of the friction posts, respectively. Each follower C is in the form of a disc having a continuous flat annular ringlike flange portion 22 surrounding the base portion of the corresponding post. The ringlike flange 22 comprises a relatively thick section 23 and an offset thinner section 24. The section 23 forms one half of the ring and the section 24 the other half. The entire inner surface of the ringlike flange 22, which is indicated by 25, lies in a single horizontal plane, the outer surface 26 of the half ring section 24 being inwardly offset with respect to the outer surface of the half section 23. The inner surface 25 of the flange 22 of each follower C provides an abutment face for the corresponding end of the spring D. The section 24 of the flange 22 of the upper follower C is in underlying engagement with the flange 10 of the post A, and the section 24 of the flange 22 of the lower follower C overlies the flange 10 of the post B, as clearly shown in Figure 1. Each follower C is provided with a pair of webs 27—27 extending laterally inwardly from opposite sides of the half ring section 23 of the flange 22. The opposed inner edges of the webs 27—27 are spaced apart, thereby leaving a slot 28 adapted to accommodate the base portion of the web or leg 14 or 18 of the corresponding post. At that portion of the follower C having the half ring section 24 of the flange 22, a semi-circular opening 29 is provided through said follower, interiorly of the flange 22, adapted to accommodate the semi-cylindrical base section of the corresponding post. As shown most clearly in Figure 1, the post A has the web or leg 14 thereof engaged through the slot 28 of the upper follower C, with the T-head 21 engaged over the webs 27—27 of said follower in shouldered engagement therewith, thereby anchoring the post A to said follower. The post B is anchored in a similar manner to the lower follower C by means of the T-head 21 of the web or leg 18 of said post B.

The spring D, which is in the form of a single heavy coil, surrounds the posts A and B and has its top and bottom ends bearing respectively on the ringlike flanges 22—22 of the top and bottom spring followers C—C. The spring D is under initial compression and holds the followers C—C seated on the flanges 10—10 of the posts. As shown in Figure 1, the upper face of the half section 23 of the ringlike flange 22 of the upper follower C is offset downwardly, slightly with respect to the upper surface of the flange 10 of the post A, and the bottom face of the section 23 of the flange 22 of the lower follower C is offset upwardly, slightly with respect to the flange 10 of the post B. The posts A and B are thus mounted for rocking tilting movement on their supports, namely, the top and bottom spring follower plates of the spring cluster of the truck springs of the railway car.

In assembling the parts of my improved shock absorber, the follower plates C—C are first applied to the posts A and B by dropping the follower plate C of each post over the same and engaging the flange section 24 of the ring flange 22 with the flange 10 of the post, and the webs 27—27 over the T-head 21 of the leg of the post. The spring D is then engaged over the post B and seated on the follower C thereof. The post A is then inserted within the coil spring through the upper end, while the posts A and B are tilted away from each other at their outer ends to permit the stop flange 13 of the post A to clear the shoulder 17 of the post B, and the posts are forced together until the shoulder 13 passes the shoulder 17, whereupon the pressure of the spring will snap the shoulder 13 into position underneath the shoulder 17, thereby locking the posts against lengthwise separation.

The improved shock absorber preferably replaces one of the spring units of a truck spring cluster, being interposed between the top and bottom spring plates of said cluster, the posts and spring follower plates of the shock absorber being provided with seats to receive the usual spring centering projections of the spring plates. As shown in the drawing, the follower plate C of each post and the base portion of said post is recessed, as indicated at 30, to provide the seat which receives the spring centering projection of the corresponding spring follower plate of the truck spring cluster.

The operation of my improved shock absorber is as follows: Upon the cluster of the truck of a railway car being compressed between the spring follower plates, the shock absorber is compressed between said spring follower plates, thereby forcing the posts A and B to slide lengthwise with respect to each other against the resistance of the spring D. As the mechanism is being compressed, the pressure exerted by the spring D on the follower plates C tends to rock or tilt the posts A and B laterally toward each other, thus placing the friction surfaces thereof in tight frictional contact. Relatively high frictional resistance is thus produced to snub the action of the truck springs. As the follower plates of the truck springs are separated, due to recoil of the springs, the posts A and B are moved apart lengthwise, being carried with the follower plates C—C to which they are anchored. This action continues until lengthwise separation of the posts is positively limited by engagement of the stop shoulder 13 of the post A with the stop shoulder 17 of the post B.

I have herein shown and described what I now consider the preferred manner of carrying out my invention, but the same is merely illustrative and I contemplate all changes and modifications that come within the scope of the claims appended hereto.

I claim:

1. In a shock absorber, the combination with a pair of lengthwise slidable friction posts having shouldered engagement with each other to limit lengthwise separation thereof, said post having a supporting base portion provided with a flange at one side and a lateral projection at the opposite side thereof; of a pair of follower plates cooperating respectively with said posts, said plates bearing on the projections of said base portions of said posts, each follower plate having a flange, with a portion of said flange in overlying shouldered engagement with the flange of the base portion of the corresponding post, said base portion extending through the corresponding follower plate and projecting outwardly beyond the same and a coil spring surrounding said posts, said spring bearing at its opposite ends on the flanges of said follower plates respectively.

2. In a shock absorber, the combination with a pair of lengthwise slidable friction posts, each post having a base flange at one side thereof and a leg member at the other side; of a pair of follower plates bearing respectively on the flanges of said posts, said follower plates having the legs of said posts anchored thereto; and a coil spring surrounding said posts and bearing at its opposite ends on said follower plates.

3. In a shock absorber, the combination with top and bottom spring follower plates having annular ringlike flanges; of top and bottom friction posts in lengthwise sliding engagement with each other, each post having a laterally extending curved base flange at one side and a T-headed leg at the other side, each post extending through the corresponding follower plate with the flange thereof bearing on said flange of the follower and the T-head anchored to the latter; and a coil spring surrounding said posts and bearing at opposite ends on the flanges of said top and bottom follower plates.

4. In a shock absorber, the combination with top and bottom friction posts having lengthwise slidable engagement with each other, said top post having a leg extending from one side, and a laterally projecting base flange on the other side, at the upper end thereof, said bottom post having a leg extending from one side, and a laterally projecting base flange on the other side at the lower end thereof, said posts being reversely arranged with the flanges thereof respectively at opposite sides of the mechanism; of top and bottom spring follower plates through which said posts extend, said top plate being anchored to the leg of said top post and extending underneath the flange of said post in contact with said flange, said bottom plate being anchored to the leg of said bottom post and extending over the flange of said bottom post in contact with said flange; and a coil spring interposed between said top and bottom followers, surrounding said posts and having its top and bottom ends bearing respectively on said top and bottom follower plates.

5. In a shock absorber, the combination with a pair of lengthwise slidable friction posts, said posts having base portions mounting said posts for tilting movement toward each other; of a pair of follower plates to which said posts are respectively anchored at said base portions, said base portions extending through said plates and projecting outwardly beyond the same; and a spring surrounding said posts and bearing at opposite ends on said follower plates.

6. In a shock absorber, the combination with a pair of lengthwise slidable friction posts, each of said posts having a base portion provided with a flange, said base portions of said posts mounting the latter for rocking movement toward each other; of a pair of follower plates bearing respectively on the base flanges of said posts, said base portions extending through said plates and projecting outwardly beyond the same, and a coil spring surrounding said posts, said spring bearing at opposite ends on said follower plates.

7. In a shock absorber, the combination with a pair of lengthwise slidable friction posts, each post having a base portion rockingly supporting said post; of a flange at one side of each post projecting from the base portion thereof, said base flanges of said posts being respectively at opposite sides of the center of the mechanism; a leg on each post projecting from the side thereof opposite to the base flange thereof; a pair of follower plates cooperating respectively with said posts, each follower plate being anchored to the leg of the corresponding post and having a ring flange bearing at one side of the center of the mechanism on the flange of said post and offset inwardly with respect to the base portion of said post at the other side of the center of the mechanism to provide clearance for tilting movement; and a coil spring surrounding said posts and bearing at its opposite ends on said plates.

GEORGE E. DATH.